(12) United States Patent
Kwon et al.

(10) Patent No.: US 12,627,871 B2
(45) Date of Patent: May 12, 2026

(54) CAMERA MODULE FOR VEHICLES AND METHOD OF ASSEMBLING THE SAME

(71) Applicant: SEKONIX CO., LTD., Dongducheon-si (KR)

(72) Inventors: Rak Beom Kwon, Suwon-si (KR); Sung Hoon Hwang, Yongin-si (KR); Jong Joo Bae, Seoul (KR); Jae Hoon Jung, Incheon (KR); Hyun Ho Ban, Seongnam-si (KR)

(73) Assignee: SEKONIX CO., LTD., Dongducheon-si (KR)

( * ) Notice: Subject to any disclaimer, the term of this patent is extended or adjusted under 35 U.S.C. 154(b) by 43 days.

(21) Appl. No.: 18/875,632

(22) PCT Filed: Jul. 19, 2023

(86) PCT No.: PCT/KR2023/010350
§ 371 (c)(1),
(2) Date: Dec. 16, 2024

(87) PCT Pub. No.: WO2024/019502
PCT Pub. Date: Jan. 25, 2024

(65) Prior Publication Data
US 2025/0168476 A1 May 22, 2025

(30) Foreign Application Priority Data
Jul. 21, 2022 (KR) ........................ 10-2022-0090002

(51) Int. Cl.
| | |
|---|---|
| *H04N 23/51* | (2023.01) |
| *H04N 23/52* | (2023.01) |
| *H04N 23/54* | (2023.01) |

(52) U.S. Cl.
CPC ............. *H04N 23/51* (2023.01); *H04N 23/52* (2023.01); *H04N 23/54* (2023.01)

(58) Field of Classification Search
None
See application file for complete search history.

(56) References Cited

U.S. PATENT DOCUMENTS

| | | |
|---|---|---|
| 2019/0179215 A1 | 6/2019 | O' Connor |
| 2020/0236266 A1 | 7/2020 | Krammer et al. |
| 2021/0323485 A1* | 10/2021 | Kim ........................ B60R 11/04 |

FOREIGN PATENT DOCUMENTS

| | | |
|---|---|---|
| KR | 10-2018-0059063 A | 6/2018 |
| KR | 10-2020-0108156 A | 9/2020 |

(Continued)

OTHER PUBLICATIONS

International Search Report mailed Oct. 24, 2023, issued to corresponding International Application No. PCT/KR2023/010350.

*Primary Examiner* — Mark T Monk
(74) *Attorney, Agent, or Firm* — Stein IP, LLC

(57) ABSTRACT

Disclosed are a camera module for vehicles and a method of assembling the same, wherein the camera module includes a lens module configured to allow a lens to be mounted therein, a circuit board including an image sensor, a front body configured to allow the lens module to be assembled to the front thereof and to allow the circuit board to be assembled thereto inward from the rear, a rear body assembled to the rear of the front body, a side weld portion formed on a side surface of the front body so as to protrude therefrom, and a flange portion formed so as to extend forwardly of the rear body, a leading edge of the flange portion being in contact with the side weld portion.

10 Claims, 8 Drawing Sheets

(56) References Cited

FOREIGN PATENT DOCUMENTS

| KR | 10-2021-0129356 | A | 10/2021 |
| KR | 10-2311872 | B1 | 10/2021 |

* cited by examiner

CAMERA MODULE FOR VEHICLES AND METHOD OF ASSEMBLING THE SAME

CROSS-REFERENCE TO RELATED APPLICATIONS

This application is a national stage of International Application No. PCT/KR2023/010350, filed Jul. 19, 2023, which claims the benefit of Korean Application No. 10-2022-0090002, filed Jul. 21, 2022, in the Korean Intellectual Property Office, the disclosures of which are incorporated herein by reference.

TECHNICAL FIELD

The present invention relates to a camera module for vehicles and a method of assembling the same, and more particularly to a camera module for vehicles, wherein each of a front body and a rear body of the camera module is manufactured by metal injection molding (MIM) so as to have a relatively small thickness while having a complex shape, weld quality of the front body and the rear body is guaranteed, and the disposition of bracket is easy due to availability of a rear space, and a method of assembling the same.

BACKGROUND ART

In recent years, a camera for vehicles has become an essential component for an advanced driver assistance system (ADAS) and autonomous driving. Examples of the ADAS include Autonomous Emergency Braking (AEB), Forward Collision Assist (FCA), Forward Collision Warning (FCW), Lane Keep Assist (LKA), Lane Departure Warning (LDW), Lane Following Assist (LFA), Lane Keeping Assistant System (LKAS), Active Blind Spot Detection (ABSD), Around View Monitoring (AVM), Low Beam Assist (LBA), Driver Attention Warning (DAW), and Smart Cruise Control (SCC), and a plurality of cameras for vehicles is applied to these systems.

A camera for vehicles is supplied in the form of a module in which an image sensor and a lens are assembled. It is preferable for a camera module for vehicles to have a small size in consideration of a limited installation space. The camera module has a complex shape, including a shape in which a lens, a circuit board including an image sensor, and a connector are coupled to each other, and is generally injection-molded from a plastic material.

Meanwhile, since the camera module for vehicles has a structure in which complete sealing is performed by welding or the like after a body is assembled, the camera module is unable to dissipate heat from the inside to the outside. In addition, the image sensor tends to generate more heat as the amount of data to be processed increases as the resolution increases.

Conventionally, therefore, a camera module capable of efficiently dissipating heat from a camera for vehicles to the outside was disclosed. Korean Patent Application Publication No. 10-2018-0059063 discloses a camera module in which a conductive member made of a metal material is molded into a housing of the camera by insert injection molding. This prior art document has a structure in which a conductive member made of a metal material is molded into an upper housing or a lower housing by insert injection molding and the conductive member is exposed to an inner space and an outer space to dissipate heat in the camera.

However, this prior art document has the disadvantage that the housing is not made of a metal material, but the conductive member of the metal material is molded into each of the upper housing and the lower housing, which is made of a plastic material with poor heat conduction performance, by insert injection molding, which limits dissipation of heat from the housing.

DISCLOSURE

Technical Problem

The present invention has been made in view of the above problems, and it is an object of the present invention to provide a camera module for vehicles configured such that each of a front body and a rear body constituting a housing of the camera module is made of a metal material, thereby greatly improving heat dissipation performance.

It is another object of the present invention to provide a camera module for vehicles configured such that each of a front body and a rear body of the camera module is manufactured by metal injection molding (MIM) so as to have a relatively small thickness while having a complex shape, whereby a large space can be allocated to a PCB disposed therein.

It is a further object of the present invention to provide a camera module for vehicles configured such that a front body and a rear body of the camera module are welded at a side surface of the camera, whereby the disposition of a bracket is easy due to availability of a rear space, and welding is performed with a laser beam fixed above while the camera is rotated, whereby welding is relatively easy and weld quality is guaranteed.

Technical Solution

In order to accomplish the above objects of the present invention, the present invention provides a camera module for vehicles, the camera module including a lens module configured to allow a lens to be mounted therein, a circuit board including an image sensor configured to convert an image received through the lens into an electrical signal, a front body configured to allow the lens module to be assembled to the front thereof and to allow the circuit board to be assembled thereto inward from the rear, the front body being manufactured using a metal injection molding (MIM) method, a rear body assembled to the rear of the front body, the rear body being manufactured using the metal injection molding (MIM) method, a side weld portion formed on a side surface of the front body so as to protrude therefrom, the side weld portion being coupled to the rear body by laser welding, and a flange portion formed so as to extend forwardly of the rear body, a leading edge of the flange portion being in contact with the side weld portion, wherein the contact parts are welded using a laser to couple the front body and the rear body to each other.

In the present invention, in order to weld the contact parts of the side weld portion and the flange portion, the camera module may be rotated 360° in the state in which the front body and the rear body are pre-assembled and welding may be performed through a laser beam fixed above, whereby sealing and assembly of the front body and the rear body may be completed.

The side weld portion may include a projection portion having a contact surface in contact with the leading edge of the flange portion, the projection portion being formed so as to extend in a direction orthogonal to the central axis of the camera module, and an insertion portion formed so as to extend rearward from the projection portion, the insertion portion being received in the rear body, the insertion portion being in contact with an inner surface of the flange portion to form a press-fit surface.

In this case, a plurality of guide ribs may be formed on an outer surface of the insertion portion so as to protrude therefrom such that no gap occurs from the inner surface of the flange portion.

In addition, the outer surface of the insertion portion may be formed as a tapered surface such that the size of the lateral shape of the insertion portion gradually decreases toward the rear.

Meanwhile, a weld surface at which the contact parts of the side weld portion and the flange portion are welded may have a chamber shape or a step shape in consideration of the depth of a heat-affected zone (HAZ) due to laser welding such that no bead is generated during the laser welding.

Welding between the front body and the rear body may be performed at a side surface of the camera module, whereby disposition of a bracket may be easy due to availability of a rear space of the rear body.

Here, the bracket may be formed at each of two or more positions including rear left and right corners of the rear body.

Meanwhile, in order to accomplish the above objects of the present invention, there is provided a method of assembling a camera module for vehicles including a lens module configured to allow a lens to be mounted therein, a circuit board including an image sensor configured to convert an image received through the lens into an electrical signal, and a front body and a rear body manufactured using a metal injection molding (MIM) method, the method including assembling the circuit board to the front body inward from the rear to assemble a front assembly, adjusting an optical axis while assembling the lens module assembled to the front of the front assembly and performing bonding, vertically pre-assembling the rear body to the rear of the front assembly to which the lens module is assembled, vertically pre-assembling the rear body to the rear of the front assembly to which the lens module is assembled by performing contact between a side weld portion formed on a side surface of the front body so as to protrude therefrom, the side weld portion being coupled to the rear body by laser welding, and a flange portion formed so as to extend forwardly of the rear body, a leading edge of the flange portion being in contact with the side weld portion, and radiating a laser beam fixed above in a vertical direction while rotating the pre-assembled front assembly and rear body by 360° to perform welding such that the front assembly and the rear body are sealed.

In the step of assembling the front assembly, the circuit board may be two-point fixed to the front body at two positions using screws, and pre-alignment is performed by aligning the concentricity of a lens unit of the front body, the optical axis of the image sensor, and a rotate when the screws are tightened.

Advantageous Effects

As is apparent from the above description, the present invention has the effect that each of a front body and a rear body is manufactured by metal injection molding (MIM), whereby heat dissipation performance thereof is greatly improved, each body has a relatively small thickness while having a complex shape, whereby a larger inner space is secured and therefore a larger region is provided for disposition of a circuit board and the like.

In addition, the present invention has the effect that welding between the front body and the rear body of the camera module is performed at a side surface of the camera, whereby the disposition of a bracket is easy due to availability of a rear space, welding is performed with a laser beam fixed above while the camera is rotated, whereby welding is relatively easy and weld quality is guaranteed.

In addition, the present invention has the effect that a material which does not require additional surface treatment, such as stainless steel, may be used to manufacture each body, whereby there is no need for additional rust protection for a laser weld part, which reduces costs.

BEST MODE

Figure 1:
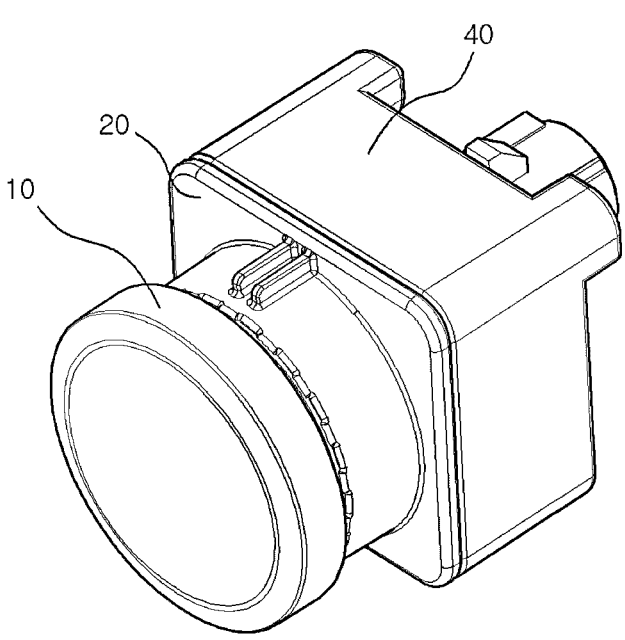
FIG. 1 is a perspective view showing a camera module for vehicles of the present invention.

Hereinafter, a preferred embodiment of the present invention will be described in detail with reference to the accompanying drawings. First of all, it should be noted that, in assigning reference numerals to components in each figure, the same components have the same numerals as much as possible, even if the components are shown in different figures. The configuration and operation of the present invention shown in the drawings and described with reference therewith are illustrated by way of at least an embodiment, which does not limit the technical idea, essential configuration, and operation of the present invention.

Figure 2:
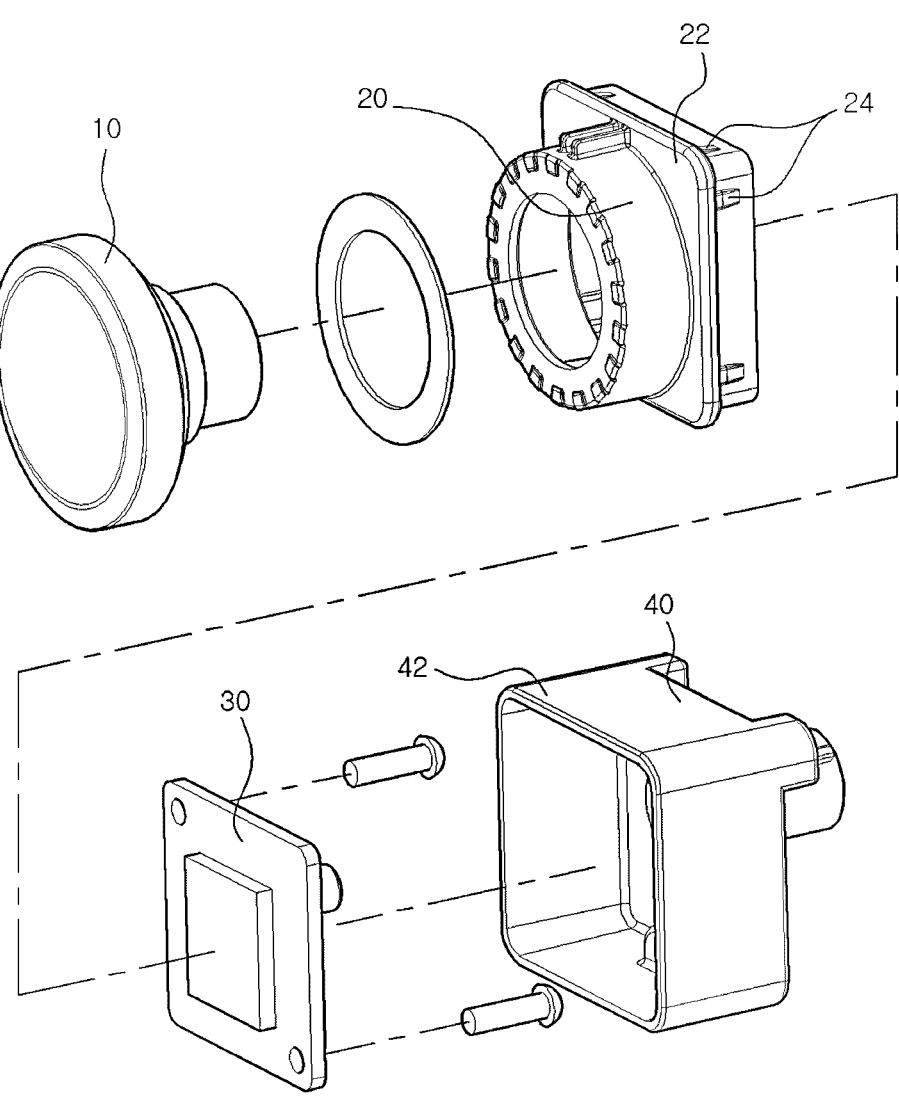
FIG. 2 is an exploded perspective view showing the camera module for vehicles of the present invention.

FIG. 1 is a perspective view showing a camera module for vehicles of the present invention, and FIG. 2 is an exploded perspective view showing the camera module for vehicles of the present invention.

Referring to the figures, a camera module for vehicles according to an embodiment of the present invention includes a lens module 10 configured to allow a lens to be mounted therein, a circuit board 30 including an image sensor configured to convert an image received through the lens into an electrical signal, a front body 20 configured to allow the lens module 10 to be assembled to the front thereof and to allow the circuit board 30 to be assembled thereto inward from the rear, the front body being manufactured using a metal injection molding (MIM) method, and a rear body 40 assembled to the rear of the front body 20, the rear body being manufactured using the metal injection molding (MIM) method.

In the camera module, the lens module 10, the front body 20, the circuit board 30, and the rear body 40 are disposed in that order from the front, which is close to a capturing region, to the rear.

The lens module 10 is generally assembled by fixing a plurality of lens elements in a lens barrel and closing the front of the lens barrel with a retainer, and the image sensor is mounted on the circuit board 30.

The present invention is characterized in that the front body 20 and the rear body 40, which constitute a housing of the camera module, are manufactured by metal injection molding (MIM).

Metal injection molding is a manufacturing process in which injection molding technology from the field of plastics and metal powder sintering technology from the field of powder metallurgy are fused, which is an advantageous method for manufacturing metal parts having complex three-dimensional shapes.

Metal injection molding may use fine powder raw materials with excellent sinterability, may obtain molded parts with uniform density under appropriate injection molding conditions, and may control the degree of shrinkage during sintering to be fairly uniform by optimizing the shape and controlling the temperature during a sintering process. In addition, the sintering temperature may be increased sufficiently to obtain a sintered product having a relative density of 95% or more. In metal injection molding, the probability of internal pore occurrence is very low because fine powder is molecularly bonded through the sintering process.

The thickness of the front body 20 or the rear body 40 is 0.5 mm to 1.0 mm, and the thickness of a front body 20 or a rear body 40 according to an embodiment of the present invention is preferably 0.85 mm. As such, each of the front body 20 and the rear body 40 according to the embodiment of the present invention may have a very small thickness while not generating internal pores, which may improve weld quality.

The metal injection molding process may be performed according to generally known methods, and SUS 316L, SUS 304L, SUS 630, SUS 420 J2, SUS 440C, SKD 11, 2% Ni—Fe, 7% Ni—Fe, or HK30 may be used as metal fine powder. These materials have high stiffness, which may ensure the rigidity of a body manufactured so as to have a small thickness.

In addition, the materials themselves may have excellent weather and environmental resistance, and therefore additional surface treatments may be omitted.

As such, each of the front body 20 and the rear body 40 manufactured by metal injection molding (MIM) has the effect of greatly improving heat dissipation performance due to thermal conductivity of the metal material and having a relatively small thickness while having a complex shape, thereby securing a wider internal space, which provides a wider region for disposition of the circuit board and the like.

Figure 3:
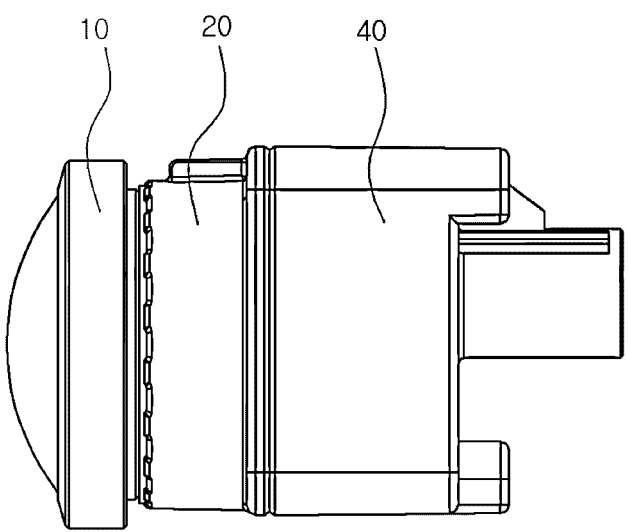
FIG. 3 is a side view showing the camera module for vehicles of the present invention.
Figure 4:
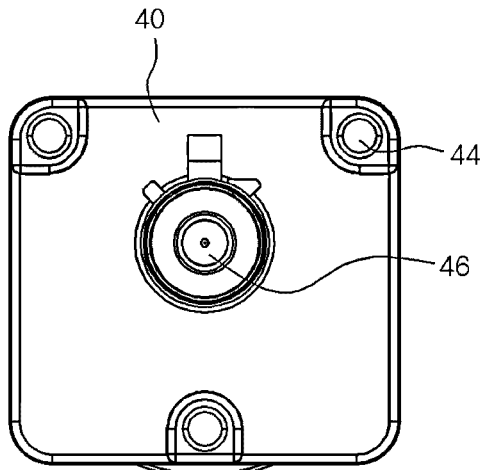
FIG. 4 is a bottom view showing the camera module for vehicles of the present invention.
Figure 5:
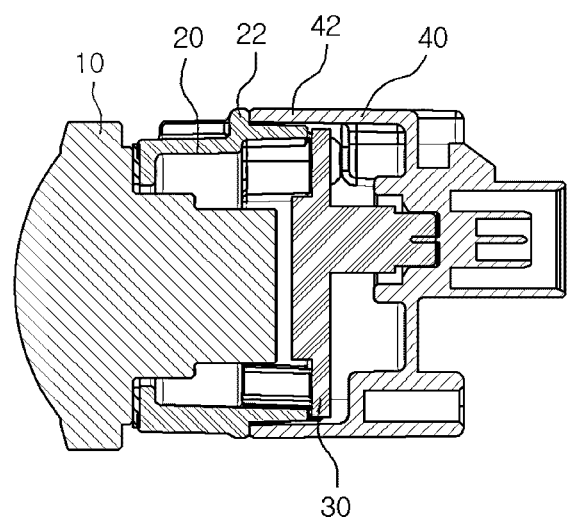
FIG. 5 is a sectional view showing the camera module for vehicles of the present invention.

FIG. 3 is a side view showing the camera module for vehicles of the present invention, FIG. 4 is a bottom view showing the camera module for vehicles of the present invention, and FIG. 5 is a sectional view showing the camera module for vehicles of the present invention.

The camera module of the present invention is received and sealed in the front body 20 and the rear body 40 such that the lens module 10 and the circuit board 30 are prevented from being contaminated by the external environment.

Here, the front body 20 and the rear body 40 are each made of the metal material, and thus have structures in which the front body and the rear body are sealed by welding contact surfaces thereof. To this end, the present invention includes a side weld portion 22 formed on a side surface of the front body 20 so as to protrude therefrom and a flange portion 42 formed so as to extend forwardly of the rear body 40, a leading edge of the flange portion being in contact with the side weld portion 22, wherein the contact parts are welded with a laser beam to couple the front body 20 and the rear body 40 to each other.

Figure 6:
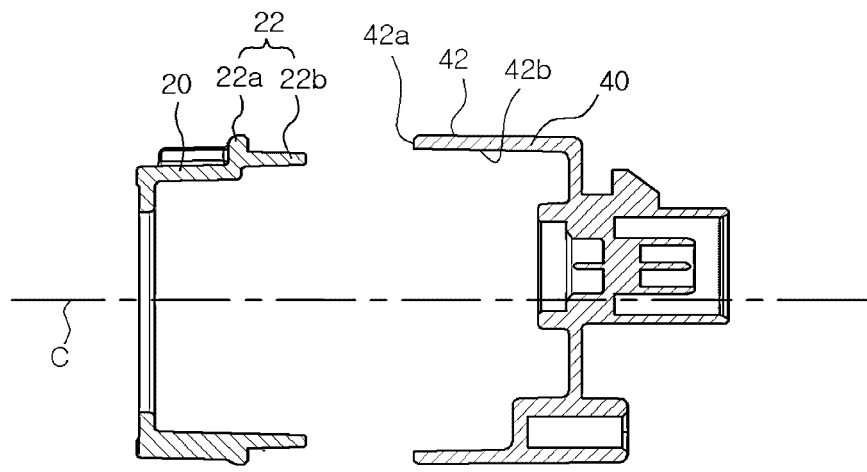
FIG. 6 is an exploded sectional view showing a side weld portion of a front body and a flange portion of a rear body of the present invention.
Figure 7:
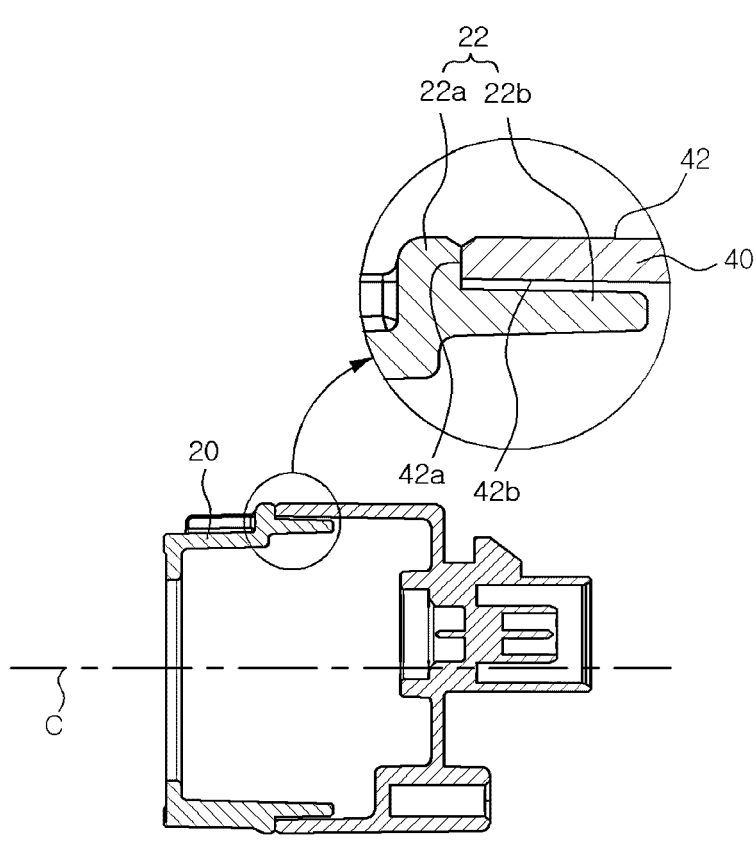
FIG. 7 is a coupled sectional view showing the side weld portion of the front body and the flange portion of the rear body of the present invention.

FIG. 6 is an exploded sectional view showing the side weld portion of the front body and the flange portion of the rear body of the present invention, and FIG. 7 is a coupled sectional view showing the side weld portion of the front body and the flange portion of the rear body of the present invention.

The side weld portion 22 may include a projection portion 22a having a contact surface in contact with the leading edge 42a of the flange portion 42, the projection portion being formed so as to extend in a direction orthogonal to the central axis C of the camera module, and an insertion portion 22b formed so as to extend rearward from the projection portion 22a, the insertion portion being received in the rear body 40, the insertion portion being in contact with an inner surface 42b of the flange portion 42 to form a press-fit surface.

The projection portion 22a and the insertion portion 22b extend in directions orthogonal to each other, and when the insertion portion 22b is inserted into and received in the rear body 40, an outer surface of the insertion portion 22b is in contact with the inner surface 42b of the flange portion 42 to form the press-fit surface. That is, the outer surface of the insertion portion 22b is the press-fit surface, which is fitted into the flange portion 42.

When the insertion portion 22b is fitted into the flange portion 42, a rear surface of the projection portion 22a comes into contact with the leading edge 42a of the flange portion 42 to form a contact surface. The rear surface of the projection portion 22a, i.e., the contact surface of the projection portion with which the leading edge 42a of the flange portion 42 comes into contact, and the leading edge 42a of the flange portion 42 form a weld surface for welding the side weld portion 22 and the flange portion 42.

As such, the camera module for vehicles of the present invention is characterized by having a structure in which welding of the front body 20 and the rear body 40 is performed on a side surface of the camera module.

In a conventional structure in which the front body 20 and the rear body 40 are coupled to each other at a rear surface of the camera module, not the side surface of the camera module, a laser may be incident on the rear of the rear body 40 such that laser welding can be performed while the laser is radiated along a weld portion. For example, a camera module body may be moved in the state in which laser equipment is stationary such that laser welding is performed along the weld portion, or the laser equipment may be moved in the state in which the camera module body is stationary such that a laser beam performs welding along the weld portion.

Since the laser beam or the camera module body performs welding while moving along the weld portion, position control of the laser beam is very difficult, and if position control is not accurately performed, poor welding may occur, which may cause problems in sealing of the front body and the rear body.

On the other hand, in the present invention, the camera module may be rotated 360° in the state in which the laser beam is fixed in order weld the contact parts of the side weld portion 22 and the flange portion 42.

That is, the camera module is rotated 360° in the state in which the front body 20 and the rear body 40 are pre-assembled, and welding is performed through the laser beam fixed above, whereby the position of the weld portion is not shifted, which not only provides ease positioning of the weld portion and ease of welding but also ensures good weld quality, and therefore the sealing of the front body and the rear body may be assured.

In addition, the camera module of the present invention has the advantage that the front body 20 and the rear body 40 are welded to each other at the side surface of the camera, whereby a bracket may be easily disposed due to availability of a rear space. Referring to FIG. 4, in the embodiment of the present invention, the bracket 44 may be formed at each of two or more positions including rear left and right corners of the rear body 40.

In a conventional case in which coupling between the front body 20 and the rear body 40 is performed at the rear surface of the camera module, the brackets cannot be formed at the corners because the weld portion is formed along the outline of the rear body 40, thereby limiting positioning of the brackets.

However, since the camera module of the present invention has the advantage that the front body 20 and the rear body 40 are welded at the side surface of the camera, whereby welding is not performed at the rear surface of the camera, the rear space is available, and the brackets may be variously disposed, and since there is no weld portion on the rear surface of the rear body 40, the rear surface is flat, whereby it is easy to flatten and level the brackets when assembling the brackets.

Figure 8:
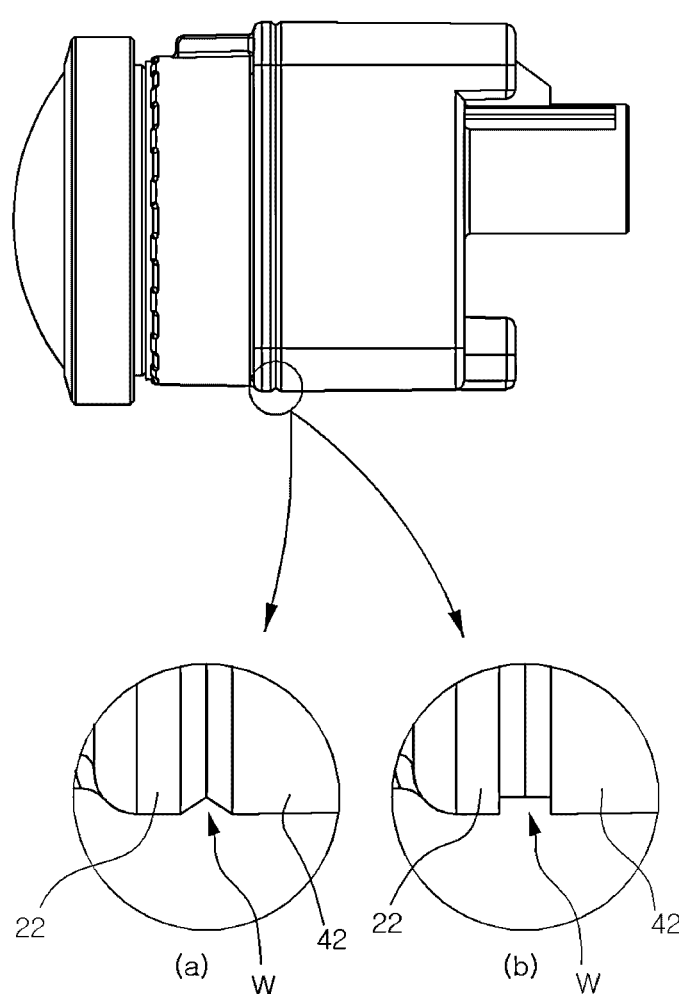
FIG. 8 is an enlarged sectional view showing an example of a bead escape shape on a weld surface of the side weld portion and the flange portion of the present invention.

FIG. 8 is an enlarged sectional view showing an example of a bead escape shape on a weld surface of the side weld portion and the flange portion of the present invention.

The projection portion 22a of the side weld portion 22 and the outer surface of the flange portion 42 are laser welded in a state of being assembled so as to be located in the same plane.

At this time, the weld surface W at which contact parts of the side weld portion 22 and the flange portion 42 are welded may have a chamber shape (a) or a step shape (b) in consideration of the depth of a heat-affected zone (HAZ) due to laser welding, as shown in FIG. 8, such that no bead is generated during the laser welding.

In this case, the width and depth of the chamber are preferably 0.2 mm and 0.1 mm, respectively, and the width and depth of the step are also preferably 0.2 mm and 0.1 mm, respectively. As such, the chamber or the step is formed at the weld surface of the present invention, whereby no bead may be generated during laser welding, and the weld surface may be smooth.

Meanwhile, a plurality of guide ribs 24 may be formed on the outer surface of the insertion portion 22b so as to protrude therefrom such that no gap occurs from the inner surface of the flange portion. Here, two guide ribs 24 are preferably formed at each of the four corners of the insertion portion 22b, whereby a total of eight guide ribs 24 are formed.

In this case, recesses may be formed in the inner surface of the flange portion at positions corresponding to the guide ribs 24, and insertion of the guide ribs 24 into the recesses may cause the insertion portion 22b and the flange portion to be coupled to each other without a gap therebetween.

In addition, the outer surface of the insertion portion 22b may be formed as a tapered surface such that the size of the lateral shape of the insertion portion gradually decreases toward the rear. That is, the press-fit surface of the insertion portion 22b is a tapered surface such that the size of the lateral shape of the insertion portion 22b decreases toward the rear, and the tapered surface facilitates entry of the insertion portion 22b in an automated process of press-fitting the front body 20 into the rear body 40.

A method of assembling the camera module for vehicles of the present invention is as follows.

Figure 9A:
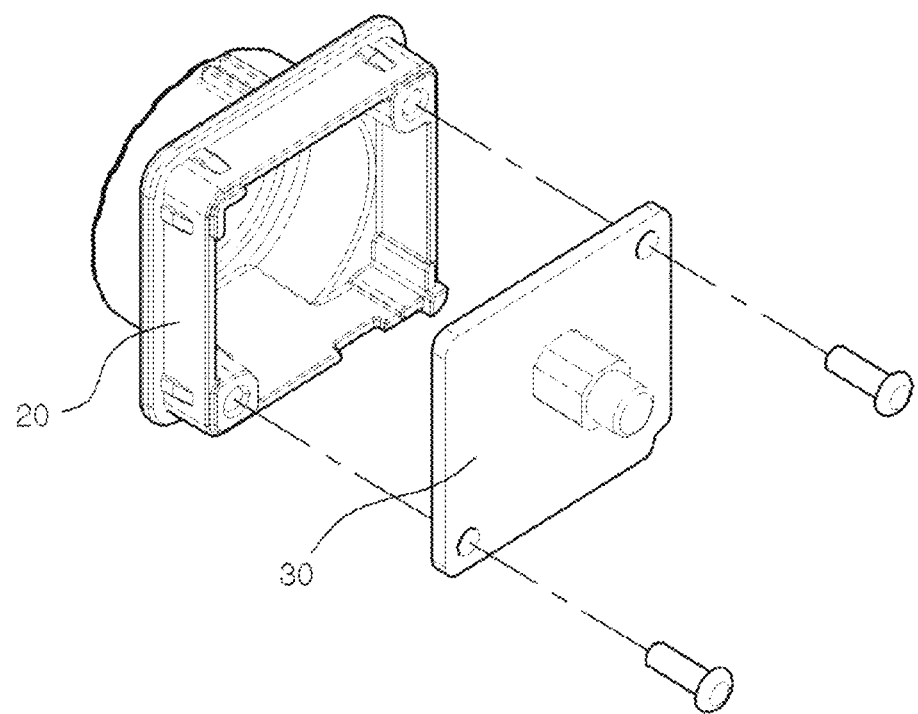
FIGS. 9A, 9B, 10A and 10B are conceptual views showing a process of assembling the camera module for vehicles of the present invention.

FIGS. 9 and 10 are conceptual views showing a process of assembling the camera module for vehicles of the present invention, wherein a front assembly is assembled by assembling the circuit board 30 having the image sensor attached thereto to the front body 20 inward from the rear (FIG. 9A).

In the step of assembling the front assembly, the circuit board 30 is two-point fixed to the front body 20 at two positions using screws, and pre-alignment is performed by aligning the concentricity of a lens unit of the front body, the optical axis of the image sensor, and a rotate when the screws are tightened.

Figure 9B:
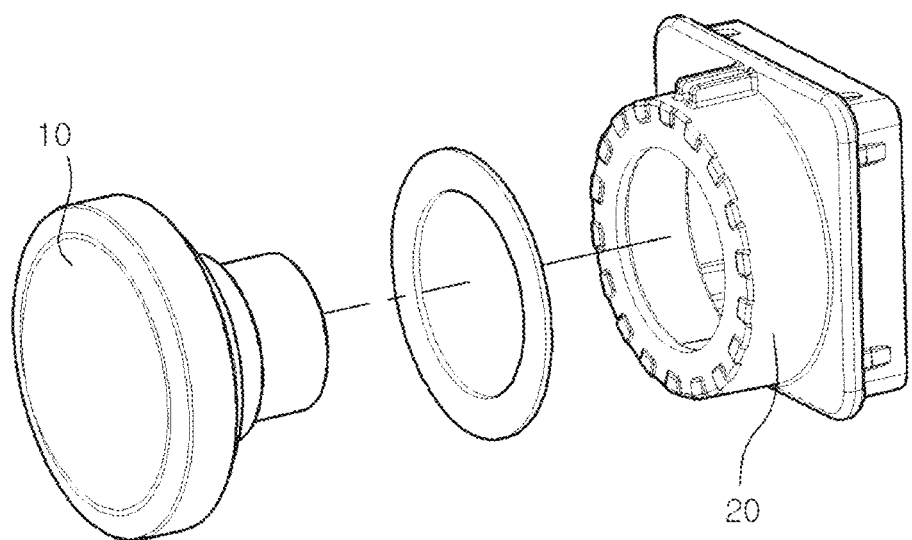
Figure 10A:
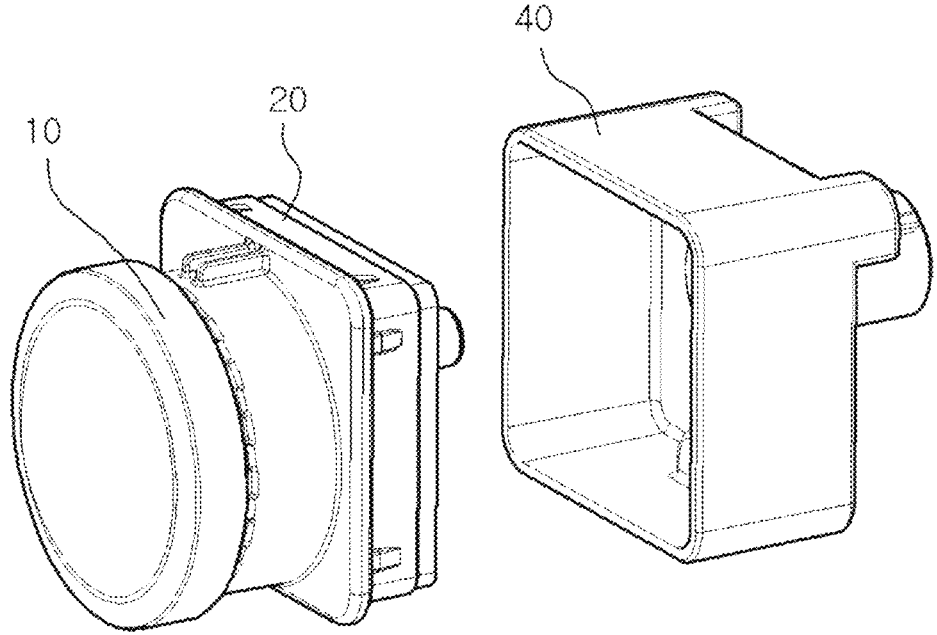

Subsequently, the optical axis is adjusted while the lens module 10 is assembled to the front of the front assembly, and then bonding is performed (FIG. 9B).

In the process of attaching the image sensor to the circuit board 30 or in the process of assembling the plurality of lens elements to the lens barrel, the optical axis alignment state may be distorted. If inaccurate images are provided due to the misaligned optical axis, the performance of parking guidance or automated driving is degraded. Therefore, 6-axis optical alignment is performed before fixing the lens module 10 and the image sensor to each other in order to ensure optical performance of the camera module. When the assembly of the optical components is completed, the front body 20 is coupled to the rear body 40 to form a sealed body assembly.

Generally, the front body 20 and rear body 40 may be assembled by screw coupling, or may be bonded using a resin adhesive. The front body 20 and the rear body 40 according to the embodiment of the present invention are manufactured by metal injection molding, and are characterized in that the rear body 40 is press-fitted into the front assembly with the optical components assembled and then the assembly interface is sealed by laser welding. Compared to the screw coupling, which may loosen due to frequent vibration and temperature changes over the long lifespan of a vehicle, or the resin adhesive, which may age and cause a gap in the sealed part, the parts coupled to each other by laser welding may provide high stability and reliability.

Figure 10B:
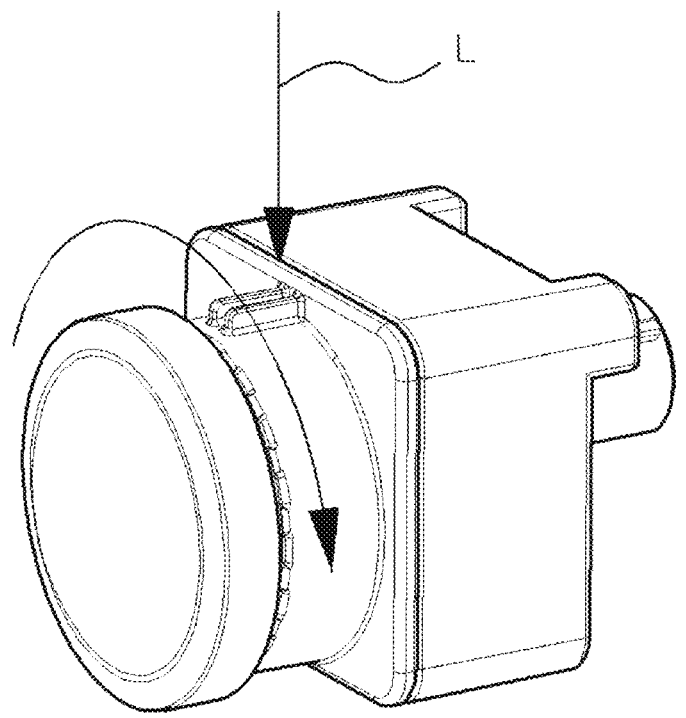

That is, after the rear body 40 is vertically pre-assembled to the rear of the front assembly to which the lens module is assembled, the side weld portion 22 of the front body 20 and the flange portion 42 are brought into contact with each other (FIG. 10A), and the front assembly and the rear body 40 are welded by radiating a laser beam L fixed above in a vertical direction while rotating the front assembly and the rear body by 360°, whereby the front assembly and the rear body are sealed (FIG. 10B)

As such, the camera module of the present invention has the effect that welding between the front body and the rear body is performed at the side surface of the camera, whereby the disposition of the brackets is easy due to availability of a rear space, and welding is performed with a laser beam fixed above while the camera is rotated, whereby welding is relatively easy and weld quality is guaranteed.

The above description is merely an exemplary description of the technical ideas of the present embodiment, and a person having ordinary skill in the art to which the present embodiment pertains will be able to make various modifications and variations without departing from the essential features of the present embodiment. Therefore, the present embodiment is intended to illustrate, not to limit, the technical ideas of the present embodiment, and the scope of the technical ideas of the present embodiment is not limited by the embodiment. The scope of protection of the present embodiment should be construed by the following claims, and all technical ideas within the scope equivalent thereto should be construed to be included in the scope of the present embodiment.

The invention claimed is:

1. A camera module for vehicles, the camera module comprising:
  a lens module configured to allow a lens to be mounted therein;
  a circuit board comprising an image sensor configured to convert an image received through the lens into an electrical signal;
  a front body configured to allow the lens module to be assembled to a front thereof and to allow the circuit board to be assembled thereto inward from a rear, the front body being manufactured using a metal injection molding (MIM) method;
  a rear body assembled to the rear of the front body, the rear body being manufactured using the metal injection molding (MIM) method;
  a side weld portion formed on a side surface of the front body so as to protrude therefrom, the side weld portion being coupled to the rear body by laser welding; and
  a flange portion formed so as to extend forwardly of the rear body, a leading edge of the flange portion being in contact with the side weld portion, wherein the contact parts are welded using a laser to couple the front body and the rear body to each other.

2. The camera module according to claim 1, wherein in order to weld the contact parts of the side weld portion and the flange portion,
  the camera module is rotated 360° in a state in which the front body and the rear body are pre-assembled and welding is performed through a laser beam fixed above, whereby sealing and assembly of the front body and the rear body are completed.

3. The camera module according to claim 1, wherein the side weld portion comprises:
  a projection portion having a contact surface in contact with the leading edge of the flange portion, the projection portion being formed so as to extend in a direction orthogonal to a central axis of the camera module; and
  an insertion portion formed so as to extend rearward from the projection portion, the insertion portion being received in the rear body, the insertion portion being in contact with an inner surface of the flange portion to form a press-fit surface.

4. The camera module according to claim 3, wherein a plurality of guide ribs is formed on an outer surface of the insertion portion so as to protrude therefrom such that no gap occurs from the inner surface of the flange portion.

5. The camera module according to claim 3, wherein an outer surface of the insertion portion is formed as a tapered surface such that a size of a lateral shape of the insertion portion gradually decreases toward a rear.

6. The camera module according to claim 1, wherein a weld surface at which the contact parts of the side weld portion and the flange portion are welded has a chamber shape or a step shape in consideration of a depth of a heat-affected zone (HAZ) due to laser welding such that no bead is generated during the laser welding.

7. The camera module according to claim 1, wherein welding between the front body and the rear body is performed at a side surface of the camera module, whereby disposition of a bracket is easy due to availability of a rear space of the rear body.

8. The camera module according to claim 7, wherein the bracket is formed at each of two or more positions comprising rear left and right corners of the rear body.

9. A method of assembling a camera module for vehicles comprising a lens module configured to allow a lens to be mounted therein, a circuit board comprising an image sensor configured to convert an image received through the lens into an electrical signal, and a front body and a rear body manufactured using a metal injection molding (MIM) method, the method comprising:
  assembling the circuit board to the front body inward from a rear to assemble a front assembly;
  adjusting an optical axis while assembling the lens module assembled to a front of the front assembly and performing bonding;
  vertically pre-assembling the rear body to a rear of the front assembly to which the lens module is assembled; and
  radiating a laser beam fixed above in a vertical direction while rotating the pre-assembled front assembly and rear body by 360° to perform side welding such that the front assembly and the rear body are sealed.

10. The method according to claim 9, wherein in the step of assembling the front assembly,
  the circuit board is two-point fixed to the front body at two positions using screws, and
  pre-alignment is performed by aligning concentricity of a lens unit of the front body, an optical axis of the image sensor, and a rotate when the screws are tightened.

* * * * *